US011535012B2

(12) United States Patent
Niedersüss et al.

(10) Patent No.: US 11,535,012 B2
(45) Date of Patent: Dec. 27, 2022

(54) POLYETHYLENE BASED LAMINATED FILM STRUCTURE WITH BARRIER PROPERTIES

(71) Applicant: BOREALIS AG, Vienna (AT)

(72) Inventors: Peter Niedersüss, Ried/Riedmark (AT); Nina Ackermans, Tessenderlo (BE); Paulo Cavacas, Coutada (PT); Willem De Wever, Hasselt (BE); Johan Defoer, Mechelen (BE)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 16/061,920

(22) PCT Filed: Dec. 13, 2016

(86) PCT No.: PCT/EP2016/080756
§ 371 (c)(1),
(2) Date: Jun. 13, 2018

(87) PCT Pub. No.: WO2017/102704
PCT Pub. Date: Jun. 22, 2017

(65) Prior Publication Data
US 2018/0370202 A1 Dec. 27, 2018

(30) Foreign Application Priority Data
Dec. 15, 2015 (EP) .................................... 15200063

(51) Int. Cl.
*B32B 27/08* (2006.01)
*B32B 27/32* (2006.01)
*B32B 27/16* (2006.01)

(52) U.S. Cl.
CPC .............. *B32B 27/08* (2013.01); *B32B 27/16* (2013.01); *B32B 27/32* (2013.01); *B32B 2250/242* (2013.01); *B32B 2255/10* (2013.01); *B32B 2255/20* (2013.01); *B32B 2255/205* (2013.01); *B32B 2270/00* (2013.01); *B32B 2307/30* (2013.01); *B32B 2307/31* (2013.01); *B32B 2307/406* (2013.01); *B32B 2307/412* (2013.01); *B32B 2307/50* (2013.01); *B32B 2307/514* (2013.01); *B32B 2307/516* (2013.01); *B32B 2307/72* (2013.01); *B32B 2307/7244* (2013.01); *B32B 2307/7246* (2013.01); *B32B 2439/46* (2013.01); *B32B 2439/70* (2013.01)

(58) Field of Classification Search
CPC ......... B32B 27/08; B32B 27/32; B32B 27/16; B32B 2307/406; B32B 2307/514; B32B 2307/7246; B32B 2255/205; B32B 2270/00; B32B 2307/516; B32B 2439/70; B32B 2255/10; B32B 2307/7244; B32B 2255/20; B32B 2439/46; B32B 2307/31; B32B 2307/72; B32B 2307/30; B32B 2307/412; B32B 2307/50; B32B 2250/242
See application file for complete search history.

(56) References Cited

U.S. PATENT DOCUMENTS

| 5,075,152 A | 12/1991 | Tsukuda et al. |
| 5,091,241 A | 2/1992 | Lang et al. |
| 6,479,137 B1 | 11/2002 | Joyner et al. |
| 2005/0131187 A1* | 6/2005 | Helland ................ C08F 210/16 526/348.1 |
| 2010/0204379 A1* | 8/2010 | Pira ............................ C08J 5/18 524/427 |
| 2011/0132975 A1* | 6/2011 | Toft ....................... D21H 19/20 229/5.84 |
| 2014/0295118 A1 | 10/2014 | Banerjee et al. |
| 2015/0251388 A1* | 9/2015 | Niedersuess ............ B32B 27/32 53/451 |

FOREIGN PATENT DOCUMENTS

| CA | 2083557 A1 | 5/1993 |
| EP | 0129368 A | 12/1984 |
| EP | 0260130 A | 3/1988 |
| EP | 0317237 A2 | 5/1989 |
| EP | 0372886 A2 | 6/1990 |
| EP | 0423101 A | 4/1991 |
| EP | 0537130 A | 4/1993 |
| EP | 0810235 A | 12/1997 |
| EP | 1941998 A | 7/2008 |
| EP | 2585298 B | 7/2014 |
| WO | 9535323 | 12/1995 |
| WO | 9638299 A1 | 12/1996 |
| WO | 9728170 | 8/1997 |
| WO | 9846616 | 10/1998 |
| WO | 9849208 | 11/1998 |
| WO | 9856831 | 12/1998 |

(Continued)

OTHER PUBLICATIONS https://www.usplastic.com/knowledgebase/article.aspx?contentkey=508 (Year: 2020).*
International search report and written opinion dated Feb. 21, 2017 in related international application PCT/EP2016/080756 (10 pages).
Encyclopedia of Polymer Science and Engineering, vol. 6 (1986), pp. 383-410.
Diamond Digest, Consumer & Lifestyle Solutions: Packaging, published Feb. 2014.
'New Borealis BorShape Covers Several Packaging Challenges in One Solution', published Mar. 11, 2010, www.packaginginsights.com/news/new-borealis-borshape-covers-several-packaging-challenges-in-one-solution.html.
Malpass, D , 'Introduction to Polymers of Ethylene', in 'Introduction to Industrial Polyethylene: Properties. Catalysts and Processes', Chapter 1, Wiley, 2010.

* cited by examiner

*Primary Examiner* — Samir Shah
(74) *Attorney, Agent, or Firm* — Meunier Carlin & Curfman LLC

(57) ABSTRACT

Laminated film structure including at least one first film having a thin ceramic or metal coating, being laminated to a second film and whereby the laminated film structure is based on polyethylene only, i.e. polymers other than polyethylene are substantially absent and whereby the laminated film structure has good barrier properties.

15 Claims, No Drawings

(56) References Cited

FOREIGN PATENT DOCUMENTS

| WO | 9912981 | 3/1999 |
| WO | 9919335 | 4/1999 |
| WO | 9951646 | 10/1999 |
| WO | 0034341 | 6/2000 |
| WO | 0155230 | 8/2001 |
| WO | 2005002744 | 1/2005 |
| WO | 2009112255 | 9/2009 |
| WO | 2013004646 A1 | 1/2013 |
| WO | WO 2014-026949 * | 2/2014 |

POLYETHYLENE BASED LAMINATED FILM STRUCTURE WITH BARRIER PROPERTIES

This invention relates to a laminated film structure comprising at least one first film having a thin ceramic or metal coating, being laminated to a second film and whereby the laminated film structure is based on polyethylene only, i.e. polymers other than polyethylene are substantially absent and whereby the laminated film structure has good barrier properties. The invention further relates to laminated articles made of such laminated film structure.

BACKGROUND ART

Laminates are widely used in the packaging industry to form all manner of articles from food containers, like vacuum-formed packages, to stand up pouches and product labels. Typical products packaged in laminated films are coffee, milk, fruit juice, cheese or meat slices, pet food, shampoo pouches or other toiletries and pharmaceutical products.

In order to render the packaging gas-tight, in particular oxygen gas-tight, for example for the purpose of aseptic packaging and packaging of milk or fruit juice, the laminate in these packaging normally comprises at least one additional gas barrier layer.

Ethylene vinyl alcohol (EVOH) has been one of the most effective barrier materials known to the flexible packaging industries, especially in providing excellent barrier for oxygen and aroma. However, the polar EVOH is not compatible with the non-polar polyolefinic films. Thus, it requires an adhesion promoter or tie-layer resin such as anhydride-modified polyolefin in order to adhere to a non-polar polyolefinic substrate. Furthermore it is generally known that films from EVOH copolymers are difficult to orient and stretch. It is believed that this is due to the large number of hydroxyl groups in the molecules of EVOH, which easily form hydrogen bonds during formation of the non-oriented film. In addition a single barrier layer of EVOH for the purpose of high barrier properties is expensive.

Aluminium foil is also widely used to improve barrier properties. Aluminium foil used in such laminated structures, however, usually leads to a rather stiff as well as bulky and weighty wrapping or package, and it is often difficult, without danger of rupturing it or of creating a crinkly, uneven wrap, to cause the laminate material to conform closely and smoothly to the material or product being wrapped, especially if a rather irregularly shaped product is involved. In addition such laminates containing an aluminium foil as barrier layer generally cannot be recycled easily and have therefore higher environmental impact.

One means attempted to obviate the use of a thick foil is to vacuum metallize the metal onto a polyolefinic substrate and thus provide an extremely thin metal layer.

Finally, films suitable for the above described laminates must also be capable of being manufactured rapidly and cheaply. Since the margins on many packaging products are small, it is important that packaging costs are kept to a very minimum.

In this regard therefore, it is obvious that thinner films are preferred since such films will be cheaper to manufacture as they require less raw material. However, the down gauging of films (i.e. making them thinner) is typically associated with a considerable loss of stiffness.

The resulting films are simply not stiff enough to be of use in laminates. If a film lacks stiffness, it will cause problems in the lamination process. Such a film may be too soft to adhere successfully to a substrate or may be too delicate to handle in the lamination apparatus.

Currently, most laminates in the market are made with polyethylene (PE) film (mono or coex) laminated with another material to provide stiffness or other desired properties. Often this other material is polyethylene terephthalate (PET). There are also other structures where polypropylene and/or aluminium foil and/or polyamides (Nylon) are used.

Nowadays there is a trend to provide "100% PE" solutions, i.e. laminates consisting of a PE film laminated to a further PE film structure, since such laminates based on a single class of resin can be more easily recycled. Recycling is a tool to improve sustainability and to safe resources and is therefore a topic of high priority.

For example EP 2 585 298 B1 describes laminated film structures being suitable for use in stand up pouches, which comprise a first film (film 1) comprising at least two layers and at least a second film (film 2) comprising at least 3 layers, whereby the laminated film structure is characterized by the substantial absence of polymers other than polyethylene.

According to the examples film 1 as well as film 2 have a thickness of 60 μm and are both unoriented and not coated with a thin ceramic or metal coating.

A further "100% PE" solution is promoted by Borealis. This solution comprises a BorLite-based MDO film (25 μm), which is laminated to a BorShape LLDPE blown film substrate (60 μm). A suitable BorLite grade for such an application is for example BorLite OPE795, which is a multimodal LLDPE with a density (ISO 1183) of 931 kg/m$_3$, MFR (190° C., 2.16 kg; ISO 1133) of 0.2 g/10 min and a melting temperature (DSC, ISO 11357-3) of 127° C. This MDO film of this full PE laminate structure is made of a blocked multilayer film of the structure A/B/B/B/C/C/B/B/B/A, wherein C is the blocking layer comprising BorLite and a plastomer (Queo 8201), B is a BorLite layer and A is a layer being composed of a high density polyethylene (HDPE). The primary film thickness is 125 μm (2×62.5 μm) before stretching and 25 μm after stretching. The film structure is also not coated with a thin ceramic or metal coating.

From US 20140295118 a metallized polyethylene laminate is described, which comprises 4 polyethylene based layers (outer layer, inner layer, extruded layer, sealant layer) and at least a first metallized acid copolymer layer, wherein the acid copolymer is e.g. ethylene acrylic acid copolymer. The layers are not oriented.

So, although "100% PE" based laminated film structures are known, there is a steady need to further improve such structures by providing alternative film formulations which can provide films of very low thickness whilst maintaining tensile modulus, optical properties like gloss and transparency and other mechanical properties and have in addition good barrier properties.

It was therefore an object of the present invention to provide such alternative film formulations, which allow even further down-gauging than known solutions, whilst improving or at least maintaining tensile modulus and furthermore maintaining the balance between optical properties like gloss and transparency and mechanical properties and having in addition good barrier properties, like good water vapour and/or gas barrier properties.

It has now been found that a particular film structure comprising at least one first film, which is coated with a thin ceramic or metal coating by vapour deposition technique, and at least a second film can fulfil the above requirements and therefore yield a full PE lamination structure with advantageous properties.

The present invention therefore relates to a laminated polyethylene based film structure having barrier properties comprising
(1) one oriented first film being at least oriented in machine direction (MDO film) which comprises
   a) at least one layer A based on polyethylene polymer having a density of 890 to 980 kg/m³ and
   b) optionally at least one layer B of high density polyethylene (HDPE) having a density of 940 up to 970 kg/m³ or a medium density polyethylene (MDPE) having a density of 925 up to 940 kg/m³ or a linear low density polyethylene (LLDPE) having a density of 910 to 950.
   whereby the oriented first film is at least oriented in machine direction in a draw ratio of 1:1.5 to 1:12 and having a film thickness after orientation of 10 to 50 µm
   and whereby the oriented first film is coated by a thin vapour deposited barrier ceramic or metal layer on one surface of the oriented first film
(2) a second film, having
   c) at least one sealant layer C based on polyethylene polymer
   d) optionally in combination with a high density polyethylene (HDPE) layer D,
whereby the oriented first film is laminated with the coated surface to the second film and wherein in the laminated film structures other polymers than ethylene based polymers are substantially absent.

The present invention furthermore relates to the use of such laminated film structures for laminated articles and to the laminated articles themselves, like vertical or horizontal Form Fill Seal (FFS) packaging, pouches, especially stand up pouches, sacks, bag, sachets, and the like.

Ad First Film:

The first film of the laminated film structure according to the present invention comprises at least one layer, being layer A.

Layer A:

Layer A is based on polyethylene polymer having a density of 890 to 980 kg/m³.

The polyethylene may be a homopolymer or it may be a copolymer. As the polyethylene may have a density of from 890 to 980 kg/m³, it may be for example a high density polyethylene (HDPE), a medium density polyethylene (MDPE) or a linear low density polyethylene (LLDPE) or blends with high pressure low density polyethylene (LDPE) or a blend of an ethylene based plastomer with high pressure low density polyethylene (LDPE).

Preferred polyethylenes for use in the manufacture of layer A of the first film are LLDPE's. MFR$_2$ (190° C., 2.16 kg, ISO 1133) of suitable LLDPE's is in the range 0.01 to 20 g/10 min, preferably in the range of 0.05 to 10 g/10 min, more preferably in the range of 0.1 to 6.0 g/10 min and even more preferably in the range of 0.1 to 5.0 g/10 min.

The LLDPE of layer A of the first film may have a density in the range of 910 to 950 kg/m³, preferably 925 to 945 kg/m³ preferably such as 930 to 940 kg/m³.

The weight average molecular weight Mw of the LLDPE is preferably in the range of 100 000 to 200 000 g/mol, The Mw/Mn of the LLDPE can be in a quite broad range. Preferred Mw/Mn values are 3 or more, such as 6 or more, even 10 or more. Ranges of 3.5 to 30 are envisaged.

The LLDPE contains at least one or two comonomer(s). Suitable comonomers are $C_3$-$C_{10}$ alpha-olefin comonomers. Thus the LLDPE can be a copolymer of ethylene and one $C_3$-$C_{10}$ alpha-olefin comonomer or a terpolymer of ethylene and two different $C_3$-$C_{10}$ alpha-olefin comonomers.

Preferably the comonomers are selected from the group of 1-butene, 1-hexene and 1-octene. It is preferred if the comonomer employed is 1-butene and/or 1-hexene. Preferred terpolymers comprise 1-butene and 1-hexene comonomers.

The overall comonomer content in the total polymer is 0.3 to 7.0% by mol, preferably 0.6 to 4.5% by mol, more preferably 1.0 to 3.5% by mol and most preferably 1.2 to 2.3% by mol.

If the LLDPE is a terpolymer of ethylene and two different $C_3$-$C_{10}$ alpha-olefin comonomers, preferably 1-butene and 1-hexene, 1-butene is present in an amount of 0.1 to 3.0% by mol, preferably 0.2 to 2.0% by mol, more preferably 0.3 to 1.5% by mol and most preferably 0.4 to 0.8% by mol and hexene is present in an amount of 0.2 to 4.0% by mol, preferably 0.4 to 2.5% by mol, more preferably 0.7 to 2.0% by mol and most preferably 0.8 to 1.5% by mol.

The LLDPE can be unimodal or multimodal, preferably multimodal. A unimodal LLDPE possesses a single peak in its GPC spectrum as it is made in a single stage process. These terms are discussed in detail above in connection with the polypropylene layer. It is most preferred if the LLDPE is a multimodal LLDPE formed from a homopolymer component and a copolymer component. These polymers are well known in the art and are available from Borealis and others, e.g. under the Borstar type trade name.

Preferably such multimodal, like bimodal LLDPEs are produced in a multi-stage polymerization using the same catalyst. Thus, two slurry reactors or two gas phase reactors could be employed. Preferably however, such multimodal, like bimodal LLDPEs are made using a slurry polymerization in a loop reactor followed by a gas phase polymerization in a gas phase reactor.

A loop reactor—gas phase reactor system is well known as Borealis technology, i.e. a BORSTAR® reactor system. The bimodal polyethylene in the core layer is thus preferably formed in a two stage process comprising a first slurry loop polymerization followed by gas phase polymerization.

The conditions used in such a process are well known. For slurry reactors, the reaction temperature will generally be in the range 60 to 110° C. (e.g. 85-110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerization may if desired be effected under supercritical conditions. Slurry polymerization may also be carried out in bulk where the reaction medium is formed from the monomer being polymerized.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a nonreactive gas such as nitrogen or low boiling point hydrocarbons such as propane together with monomer (e.g. ethylene).

The LLDPE suitable for the invention can be produced using Ziegler Natta catalysis or single site catalysis (mLLDPE), but is preferably produced using a Ziegler Natta catalyst. Such catalysts are well known in the art.

Suitable HDPE has a density within the range of 940 up to 980 kg/m$^3$, preferably of about 945 kg/m$^3$ to about 965 kg/m$^3$. More preferably, the density is within the range of about 950 kg/m$^3$ to about 965 kg/m$^3$.

Preferably the HDPE is a unimodal HDPE.

HDPEs of use in the invention can be homopolymers or copolymers with at least one alpha-olefin having from 3 to 10 carbon atoms.

The melt flow rate (MFR) of the HDPE polymer to be employed for layer B in accordance with the present invention is not critical and can be varied depending on the mechanical properties desired for an end application.

In one preferable embodiment MFR$_2$ value in the range of from 0.05 to 15.0 g/10 min, preferably 0.1 to 10.0 g/10 min, more preferably from 0.2 to 7.0 g/10 min, yet more preferably 0.3 to 5.0 g/10 min, even more preferably 0.4 to 2.0 g/10 min an most preferably 0.5 to 1.3 g/10 min are desired.

The molecular weight distribution (MWD) expressed as Mw/Mn of the HDPE polymer to be employed in accordance with the present invention can be in a broad range. MWD is preferably in the range from 2 to 20, preferably 2.5 to 15, more preferably 3 to 10 and most preferably 3.5 to 7.

The HDPE polymer to be employed in accordance with the present invention may be a known and e.g. commercially available, polyethylene polymer or said HDPE polymer may be prepared using any coordination catalyst, typically ZN catalysts, Cr-catalyst as well as single site catalysts (SSC) in well-documented polymerization processes.

Layer A of the first film may of course contain a blend of different components, like the combination of a tubular or autoclave (high pressure) low density polyethylene (LDPE) and an LLDPE or the combination of unimodal and bimodal LLDPE polymers or a blend of tubular or autoclave (high pressure) LDPE as defined above and an ethylene based plastomer with a density below 915 kg/m$^3$.

If layer A contains a blend of LLDPE and LDPE then the blend comprise a) 5 to 60 wt % of the LLDPE, preferably the multimodal, like bimodal LLDPE, more preferably the bimodal terpolymer and b) 40 to 95 wt % of the tubular or autoclave (high pressure) low density polyethylene (LDPE), preferably the tubular low density polyethylene homopolymer.

Preferably the blends comprise a) 10 to 50 wt % LLDPE and b) 50 to 90 wt % LDPE, more preferably a) 20 to 40 wt % LLDPE and b) 60 to 80 wt % LDPE, and even more preferably a) 25 to 35 wt % LLDPE and b) 65 to 75 wt % LDPE.

If layer A contains a blend of tubular or autoclave (high pressure) LDPE and an ethylene based plastomer, the ethylene based plastomer is present in an amount of 10 to 45 wt %, preferably 20 to 40 wt %, and the LDPE is present in an amount of 55 to 90 wt %, preferably 60 to 80 wt %.

Suitable low density polyethylenes (LDPE) for such blends can be produced in a tubular reactor or by autoclave technique.

Polymerisation in tubular or autoclave reactor is well known and well documented in the literature in the polymerisation field.

The low density polyethylene (LDPE) preferably is a low density homopolymer of ethylene (referred herein as LDPE homopolymer).

Generally, the polymerization of the low density polyethylene (LDPE) is performed by reacting the monomers under the action of one or more radical initiators, such as peroxides, oxygen, azo compounds or combinations thereof, at a temperature of about 150 to 350° C. and at a pressure of about 100 to 400 MPa preferably in a tubular reactor. The monomers are normally compressed in several stages up to the desired pressure before introduction into the reactor. The LDPE used according to the invention may be produced in a tubular reactor, as already stated above. A tubular reactor typically consists of several hundred meters of jacketed high pressure tubing arranged as a series of straight sections connected by 180° bends. Tubular reactors are either single-feed or multi-feed reactors, including split-feed reactors. In a single-feed tubular reactor (also referred to as front-feed reactor), the total monomer flow is fed to the inlet of the first reaction zone. In a multi-feed tubular reactor, the monomers are fed into the reactor at several locations along the reactor. In a split-feed reactor, the compressed monomer mixture are split into several streams and fed into the reactor at different locations thereof. Reaction is started by injection of the radical initiators. The reaction mixture cools after the first reaction peak and additional initiator is added to start a second reaction zone. The number of initiator injection points determines the number of reaction zones. A tubular reactor for production of ethylene polymers by high pressure radical polymerization usually comprises a total of two to five reaction zones. When the reaction is completed, the temperature and the pressure are lowered, typically in two steps using a high-pressure separator and a low-pressure separator. The resulting polymer is recovered and non-reacted monomers are either removed or recycled back to the reactor. As radical initiators, initiators commonly known in the art may be employed. Further details of the production of ethylene polymers by high pressure radical polymerization can be found for example in the Encyclopedia of Polymer Science and Engineering, Vol. 6 (1986), pp 383-410.

Suitable tubular technologies/processes are well known in the art. Examples are LyondellBasell Lupotech T, SABTEC CTR tubular LDPE technology, ExxonMobil Chemical's high pressure tubular process or DSM's 'Clean Tubular Reactor Technology'.

For the autoclave process the reaction pressure is typically in the range of 130 to 200 MPa. To bring the ethylene to this reaction pressure normally two compressors are used, which also take in unreacted recycle ethylene from the separators.

The autoclave reactor takes in the pressurized ethylene, to which organic peroxides are added to create free radicals, in order to initiate the polymerization process. This reaction propagates the formation of CH2 polymer chains. The reactor mixer ensures even distribution of the polymerization process in the reactor.

The autoclave functions as an adiabatic continuous stirred-tank reactor (CSTR), with the heat of reaction being removed by the fresh ethylene entering the reactor.

Most modern reactors have two or more zones with increasing temperatures. The reaction temperatures are maintained constant by controlling the speeds of the pumps feeding initiators into the respective zones. The first zone is typically 160° C. up to 180° C. and the final zone 290° C. up to 310° C.

The free radical initiator is introduced in each of the different reactor zones to optimize productivity and performance.

The reaction is terminated at the bottom of the reactor and the LDPE melt exits for the high pressure (HP) and low pressure (LP) separators, where it is cooled, and unreacted ethylene is re-compressed and recycled back to the autoclave reactor, as mentioned above.

Low molecular weight polymers (wax, oils) are removed in other separators. The purified LDPE exits the LP separator and is then sent to the extruders where the melt is homogenized, more property enhancing additives are added, and the final product is pelletized and de-gassed before packaging and delivery.

Suitable autoclave technologies/processes are also well known in the art and are, for example, licensed by Exxon-Mobil, ICI (through Simon Carves), LyondellBasell (LUPOTECH A) or Versalis.

Suitable plastomers are ethylene based plastomer with a density below 915 kg/m$^3$.

The ethylene based plastomer is a copolymer of ethylene and propylene or a $C_4$-$C_{10}$ alpha olefin.

Suitable $C_4$-$C_{10}$ alpha-olefin include 1-butene, 1-hexene and 1-octene, preferably 1-butene or 1-octene and more preferably 1-octene.

Preferably copolymers of ethylene and 1-octene are used.

Suitable ethylene based plastomers have a density in the range of 860 to 915 kg/m$^3$, preferably in the range of 870 to 910 kg/m$^3$.

The MFR$_2$ (ISO 1133; 190° C.; 2.16 kg) of suitable ethylene based plastomers is in the range of 0.3-30 g/10 min, preferably in the range of 0.4-20 g/10 min and more preferably in the range of 0.5-15.0 g/min.

The melting points (measured with DSC according to ISO 11357-3:1999) of suitable ethylene based plastomers are below 130° C., preferably below 120° C., more preferably below 110° C. and most preferably below 100° C.

Furthermore suitable ethylene based plastomers have a glass transition temperature Tg (measured with DMTA according to ISO 6721-7) of below −25° C., preferably below −30° C., more preferably below −35° C.

In case the copolymer is a copolymer of ethylene and propylene it has an ethylene content from 10 to 55 wt %, preferably from 15 to 50 wt % and more preferably from 18 to 48 wt %.

In case the copolymer is a copolymer of ethylene and a C4-C10 alpha olefin it has an ethylene content from 60 to 95 wt %, preferably from 65 to 90 wt % and more preferably from 70 to 88 wt %.

The molecular mass distribution Mw/Mn of suitable ethylene based plastomers is most often below 4, such as 3.8 or below, but is at least 1.7. It is preferably between 3.5 and 1.8.

Suitable ethylene based plastomers can be any copolymer of ethylene and propylene or ethylene and $C_4$-$C_{10}$ alpha olefin having the above defined properties, which are commercial available, i.a. from Borealis under the tradename Queo, from DOW Chemical Corp (USA) under the tradename Engage or Affinity, or from Mitsui under the tradename Tafmer.

Alternately these ethylene based plastomers can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably these ethylene based plastomers are prepared by a one stage or two stage solution polymerization process, especially by high temperature solution polymerization process at temperatures higher than 100° C.

Such process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110°, more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted C6-10-hydrocarbon solvents are used.

A known solution technology suitable for the process according to the invention is the COMPACT technology.

The polyethylene of layer A may also contain antioxidants, process stabilizers, slip agents, pigments, UV-stabilizers and other additives known in the art.

Examples of stabilizers are hindered phenols, hindered amines, phosphates, phosphites and phosphonites.

Examples of pigments are carbon black, ultra marine blue and titanium dioxide.

Examples of other additives are e. g. clay, talc, calcium carbonate, calcium stearate, zinc stearate and antistatic additives like.

Layer B

The first film of the laminated film structure according to the present invention comprises optionally at least one further layer, being layer B.

Layer B can be made of high density polyethylene (HDPE) having a density of 940 up to 970 kg/m$^3$ or of a medium density polyethylene (MDPE) having a density of 925 up to 940 kg/m$^3$ or a linear low density polyethylene (LLDPE) having a density of 910 up to 950 kg/m$^3$.

Suitable MDPE preferably has a density within the range of about 930 kg/m$^3$ to about 940 kg/m$^3$. Preferred MDPE is a copolymer that comprises from about 85 wt % to about 98 wt % of recurring units of ethylene and from about 2 wt % to about 15 wt % of recurring units of a $C_3$ to $C_{10}$ alpha-olefin. Suitable $C_3$ to $C_{10}$ alpha-olefins include propylene, 1-butene, 1-pentene, 1-hexene, 4-methyl-1-pentene, and 1-octene, the like, and mixtures thereof. Preferably, the MDPE has a bimodal or multimodal molecular weight distribution. Method for making bimodal or multimodal MDPE is known.

Suitable HDPE are those as already described for layer A.

Suitable LLDPEs are those as already described for layer A.

The MDPE or HDPE or LLDPE of layer B may also contain minor amounts of conventional additives such as antioxidants, UV stabilisers, acid scavengers, nucleating agents, anti-blocking agents, slip agents etc. as well as polymer processing agent (PPA). The additives can be added as single components or as part of a masterbatch as is known in the art.

First Film Structure

The first film of the invention can be a monolayer film, thus being composed of layer A only.

First films of the invention can also be multi-layered. Multilayer films are preferably formed from at least two layers, ideally at least three layers, such as 3 layers, 5 layers or 7 layers. Films preferably comprise therefore at least adjacent layers A and B, preferably A, B and E.

In case the first film is a multilayer film, the film comprises at least layer A and layer B, optionally in combination with layer E.

If the multilayer film comprises a layer E, this layer can be made of high density polyethylene (HDPE) having a density of 940 up to 970 kg/m$^3$ or of a medium density polyethylene (MDPE) having a density of 925 up to 940 kg/m$^3$ or of a linear low density polyethylene (LLDPE) having a density of 910 up to 950 kg/m$^3$, as defined for layer B.

Layer E may be the same as layer B or may be different from layer B.

Layer E may also contain minor amounts of conventional additives such as antioxidants, UV stabilisers, acid scavengers, nucleating agents, anti-blocking agents, slip agents etc. as well as polymer processing agent (PPA). The additives can be added as single components or as part of a masterbatch as is known in the art.

Such a film has the structure E/A/B and is unblocked.

The film thickness distribution (%) of an E/A/B layer film is preferably 10 to 40%/20 to 80%/10 to 40%, preferably 12 to 30%/40 to 76%/12 to 30%, of the total film thickness (100%).

The first film according to the present invention can also have 5 or 7 layers, whereby the additional layers can be made of any polyethylene.

In one embodiment of the invention it is nevertheless preferred to use a blocked film structure as first film.

In this case the first film has the structure E/A/BL/BL/A/B or E/A/A/A/BL/BL/A/A/A/B, wherein BL is the blocking layer and layers A, B and E are defined as described above and layer E is identical to layer B.

For an E/A/BL/BL/A/B film structure the thickness of the layers may conform to 7.5-27.5%/15-35%/5-25%/15-35%/7.5-27.5%, wherein the total film thickness is 100% and the amount of blocking layer is the sum of two layers (BL).

The blocking layer (BL) is in this case composes of a blend of a LLDPE as described above for the layer A and of a plastomer, as described above or of a blend of the LDPE, as described above, and an ethylene based plastomer with a density below 915 kg/m$^3$ as described above.

The plastomer is preferably present in the blends in an amount of 20 to 80 wt %, more preferably in an amount of 40 to 75 wt % and even more preferably in an amount of 50 to 70 wt %.

In principle any blend ratio is suitable, as long as the blend fulfils its task as blocking layer.

It is also possible to use 100 wt % plastomer for the blocking layer or any other PE based material known in the state of the art for being suitable in blocking layers, like EVA, EBA, mPE, etc.

Ad Film Preparation

Any blend used in the above described layers can be produced by any suitable melt mixing process at temperatures above the melting point of the respective blend. Typical devices for performing said melt mixing process are twin screw extruders, single screw extruders optionally combined with static mixers, chamber kneaders like Farrel kneaders, Banbury type mixers and reciprocating co-kneaders like Buss co-kneaders. Preferably, the melt mixing process is carried out in a twin screw extruder with high intensity mixing segments and preferably at a temperature of 170 to 270° C., more preferably of 180 to 250° C.

It is also possible to produce the blend of terpolymer and plastomer by dry-blending in a suitable mixing equipment, like horizontal and vertical agitated chambers, tumbling vessels, and Turbula mixers, as long as sufficient homogeneity is obtained.

The three-layer structure in accordance with the present invention may be prepared by any conventional film extrusion procedure known in the art, e.g. with blown film extrusion. Preferably, the three-layer film is formed by blown film extrusion, more preferably by co-extrusion processes, which in principle are known and available to the skilled person.

Typical processes for preparing a three-layer structure in accordance with the present invention are extrusion processes through an angular die, followed by blowing into a tubular film by forming a bubble which is collapsed between the rollers after solidification. This film can then be slid, cut or converted, such as by using a gazette head, as desired. Conventional film production techniques may be used in this regard. Typically layer A and layers B and C are coextruded at a temperature in the range of from 160 to 240° C. and cooled by blowing gas (generally air) at a temperature of 5 to 50° C., to provide a frost line height of 1 or 2 to 8 times the diameter of the dye. The blow up ratio can be in the range of from 1 (1:1) to 4 (1:4), preferably 1.5 (1:1.5) to 3.5 (1:3.5), more preferably from 2 (1:2) to 3 (1:3).

The film preparation process steps of the invention are known and may be carried out in one film line in a manner known in the art. Such film lines are commercially available, for example from Windmöller & Hölscher, Reifenhauser, Hosokawa Alpine, etc.

Typically the three-layer structure (E/A/B) is produced on a 3-layer co-extrusion line, but in some embodiments it may be appreciated that the used co-extruder is a 5 or 7 layer co-extrusion line.

In such a set up the central dies may all extrude A-layer material to form an E/A/A/A/B or E/A/A/A/A/B type film or each of the two, respectively three outer dies may extrude outer layer-layer material to form an E/E/A/B/B or E/E/E/A/B/B/B type film or as a combination of the before described possibilities an E/E/A/A/A/B/B type film could be produced, too. As all these outer (B and E layers)—respectively A-layers are identical, the films produced are effectively still E/A/B films.

Such 5-layer or 7-layer co-extrusion lines can also be used to produce the following structures:

A/A/A/A/A or A/A/A/A/A/A/A, which are still monolayer films as the A-layers are identical.

A/B/B/B/A or A/A/B/A/A or A/A/B/B/A/A, etc., which are still two-layer films.

If the first film includes additional layers to layer A, B and E, like layer F and/or layer G the film structure may look like E/F/A/G/B and any combinations thereof, which are possible on a 5-layer or 7-layer co-extrusion line Blocked Film Structure For the blocked film B (or E)/A/BL type structure is used, where B (or E) is one of the outer layers (E or B being the same in the blocked structure), A is the core layer and layer BL is the blocking layer. As the three layer coextruded film exits the die in the form of a bubble, the bubble is cut and then two halves forced together to effectively form an B/A/BL/BL/A/B type structure (i.e. the formed bubble is collapsed e.g. at the nip rolls to form said film). In this way, the film thickness is effectively doubled and the desired initial film thickness achieved. This is called film blocking in the art.

Thus, the B/A/BL/BL/A/B film is formed from two identical B (or E)/A/BL films laminated together via their (BL) layers.

For the B/A/A/A/BL/BL/A/A/A/B film two identical B/A/A/A/BL films were produced on a 5-layer co-extrusion line and the resulting bubble is collapsed to form the corresponding blocked film structure.

In addition it is also possible to use other combinations of layers A, B, E and/or F or G with blocking layer BL to produce the first film as blocked film structure.

Orientation

The first film is oriented at least in the machine direction according to the present invention. The obtained monolayer or multilayer film is subjected to a subsequent stretching step, wherein the film is stretched in the machine direction (MDO). Stretching may be carried out by any conventional technique using any conventional stretching devices which are well known to those skilled in the art.

The MDO process can be done in-line, wherein the MDO unit is directly linked to the blown film unit, i.e. the film leaving the blown film line is directly transferred in the MDO unit.

The MDO process can also be done off-line, wherein the MDO unit is an autonomous unit. In this case the film leaving the blown film line is first wound on a winder and is then supplied to the off-line MDO unit, where the film has to be unwind on a un-winder unit before it can be stretched.

If blocked film structures are used, the MDO process is preferably done in-line.

During the MDO, the film obtained from the blown-film line is heated to an orientation temperature. Preferably, the temperature range for orientation can be 25K below the VICAT A-level of the (outer) film layer material up to the melting temperature of the (outer) film layer material. The heating is preferably performed utilizing multiple heating rollers.

Next, the heated film is fed into a slow drawing roll with a nip roller, which has the same rolling speed as the heating rollers. The film then enters a fast drawing roll. The fast drawing roll has a speed that is 2 to 10 times faster than the slow draw roll, which effectively orients the film on a continuous basis.

The oriented film then enters annealing thermal rollers, which allow stress relaxation by holding the film at an elevated temperature for a period of time.

The annealing temperature is preferably within the same temperature range as used for stretching or slightly below (e.g. 10 to 20K below), with room temperature being the lower limit. Finally, the film is cooled through cooling rollers to an ambient temperature.

The ratio of the film thickness before and after orientation is called "drawdown ratio" or stretch ratio.

The stretch ratio varies depending on many factors including the desired film thickness, film properties, and multilayer film structures.

The preparation process of the uniaxially oriented in MD monolayer or multilayer film of the invention comprises at least the steps of forming the monolayer or multilayer film and stretching the obtained monolayer or multilayer film in the machine direction in a draw ratio of of 1:1.5 to 1:12, preferably in the range of 1:2.0 to 1:10, more preferably in the range of 1:3.0 to 1:8.

The film is stretched 1.5 to 12 times up its original length in the machine direction. This is stated herein as a stretch ratio of 1:1.5 to 1:12, i.e. "1" represents the original length of the film and "1.5" or "12" denotes that it has been stretched to 1.5 or 12 times that original length. An effect of stretching (or drawing) is that the thickness of the film is similarly reduced. Thus a stretch ratio of 1:1.5 or 1:12 preferably also means that the thickness of the film is less than 1.5 times or 12 times the original thickness.

After orientation, the first film of the invention has a film thickness of 10 to 50 μm, preferably 15 to 45 μm and more preferably 20 to 40 μm.

This means for example using a stretch ratio of 1:3 to yield a 40 μm film needs a primary film of 120 μm and using a stretch ratio of 1:12 to yield a 40 μm film needs a primary film of 480 μm.

The first film (i.e. the MDO film) is preferably characterized by the following properties
  i) a tensile modulus (according to ISO 527-3) in machine direction measured on a 25 μm MDO film at room temperature of at least 800 MPa, more preferably of at least 850 MPa,
  ii) a tensile modulus (according to ISO 527-1 and 527-3) in machine direction measured on a 25 μm MDO film at 70° C. of at least 100 MPa, more preferably of at least 110 MPa, still more preferably of at least 120 MPa and most preferably of at least 150 MPa
  iii) a ratio of i) to ii) of equal to below 10

The first film may have no gloss if there is no market requirement, but if gloss is required, then the first film preferably has
  iv) a gloss (20°) according to ASTM D2457 for a film thickness of 25 μm of at least 30%, more preferably of at least 40%, still more preferably of at least 50% and most preferably of at least 60%.

If haze of the first film is not important for the desired application, then haze can be also up to 100%, but if haze should be low or relatively low for the desired application then the first film preferably has
  v) a haze according to ASTM D1003 for a film thickness of 25 μm of below 30%, more preferably of below 25%, still more preferably of below 20% and most preferably of below 15%.

If desired the first film can also be biaxially oriented, thus being oriented in machine direction as well as in transverse direction (TD). Suitable draw ratios in transverse direction are 1:4 to 1:13, preferably in the range of 1:5.0 to 1:10, more preferably in the range of 1:5.5 to 1:8.

If the first film is a biaxially oriented film, then the film thickness before orientation is higher than for only using machine orientation to achieve the desired end film thickness after orientation. This is within the knowledge of art skilled persons.

Preferably the first film is only oriented in machine direction.

Vapour Deposited Barrier Ceramic or Metal Layer

The first film, which is oriented at least in the machine direction as described above, is coated with a thin barrier ceramic or metal layer by vapour depositing techniques on one surface of the first film.

The surface of the first film is coated with either a thin ceramic or metal layer typically used in packaging materials, preferably a metal or metal oxide layer, e.g. of Al, AlOx SiOx or other inorganic oxides, which are coated by vacuum deposition.

Generally, the vapour deposition coating of a barrier layer onto a polymer substrate film is carried out by means of a continuous method of physical or chemical vapour deposition. Various coatings of ceramic or metal composition may be applied by this type of methods. Generally, the thickness of such vapour deposited coatings may vary between 5 and 200 nm. Below 5 nm the barrier properties may be too low to be useful and above 200 nm, the coating is less flexible and, thus, more prone to cracking when applied onto a flexible substrate.

Preferably the thickness of such vapour deposited coatings is in the range of 5 to 100 nm, more preferably in the range of 8 to 50 nm.

A preferred metal according to the present invention is aluminium, although any other metal capable of being vacuum deposited may be used according to the invention.

Thus, less preferred and less common metals such as Au, Ag, Cr, Zn, Ti or Cu are conceivable also. Generally, thin coatings of pure metal or a mixture of metal and metal oxide provide barrier properties against water vapour and are used when the desired function is to prevent water vapour from migrating into and through the multilayer film or packaging laminate. However, also gas barrier properties are achieved. Most preferably, the metal in a metallization coating is aluminium (Al).

Preferred examples of ceramic coatings suitable as barrier layer according to the invention are SiOx coatings also containing carbon in their formula and AlOx coatings, MgOx coatings also being conceivable.

One preferred coating is a coating of aluminium oxide having the formula AlOx wherein x varies from 1.0 to 1.5 times Al, preferably of $Al_2O_3$. The thickness of such a coating is from 5 to 100 nm, preferably from 5 to 30 nm.

Preferably, these ceramic coatings are applied by means of physical vapour deposition (PVD), wherein metal or silicon vapour is deposited onto the substrate under oxidizing circumstances, thus forming an amorphous metal oxide or silicon oxide layer.

Other preferred silicon oxide-based coatings, are SiOxCy and SiOxCyNz coatings. Such coatings often provide good gas barrier properties, and in some cases also water vapour barrier properties.

The first film according to the invention is then laminated to a second film after the coating step.

Ad Second Film

The second film may be an unoriented film or a film being at least oriented in machine direction (MDO) and optionally also in transverse direction (TD). Preferably the second film is an unoriented film or an MDO-film. More preferably the second film is unoriented.

The second film of the laminate according to the present invention has a final thickness of 10 to 250 μm, preferably of 15 to 200 μm, more preferably from 20 to 150 μm and even more preferably from 50 to 100 μm.

The second film has at least a sealant layer C based on polyethylene having a density of 890 to 950 kg/m³.

Suitable polyethylene polymers are known in the art and standard polyethylene layers are also commercially available.

The polyethylene may be a homopolymer made in a low pressure or high pressure process (LDPE) or it may be a copolymer. As the polyethylene may have a density of from 890 to 950 kg/m³, it may be a medium density polyethylene (MDPE) or a linear low density polyethylene (LLDPE), as described for Layer A, and any combinations therefrom.

Preferably the sealant layer C comprises a blend of a linear low density polyethylene (LLDPE), produced either with a Ziegler-Natta catalyst (znLLDPE) or produced with a metallocene catalyst (mLLDPE) or an ethylene-based plastomer with a low density polyethylene (LDPE).

Suitable znLLDPE are those as described for layer A.

As used herein, the mLLDPE polymer is an ethylene copolymer having a density of 940 kg/m³ or less. Preferred mLLDPE's may have a density of 905 to 940 kg/m³, more preferably 910 to 937 kg/m³. In one preferable embodiment even densities of 915 to 925 kg/m³ are highly feasible.

The mLLDPE is formed from ethylene along with at least one $C_3$-$C_{20}$-alpha-olefin comonomer, preferably $C_3$-$C_{12}$-alpha-olefin comonomer, e.g. 1-butene, 1-hexene or 1-octene. Preferably, the mLLDPE is a binary copolymer, i.e. the polymer contains ethylene and one comonomer, or a terpolymer, i.e. the polymer contains ethylene and two or three, preferably two, comonomers. Preferably, the mLLDPE comprises an ethylene-hexene copolymer, ethylene-octene copolymer, ethylene-butene copolymer or a terpolymer of ethylene with 1-butene and 1-hexene comonomers. The amount of comonomer present in the mLLDPE is preferably 0.5 to 12 mol %, more preferably 2 to 10 mol %, and most preferably 4 to 8 mol %.

Alternatively, comonomer contents present in the mLLDPE may be 1.5 to 10 wt %, especially 2 to 8 wt %.

The $MFR_2$ of mLLDPE's is preferably in the 0.01 to 20 g/10 min, more preferably 0.2 to 10 g/10 min, even more preferably 0.3 to 6.0 g/10 min, and most preferably 0.4 to 5.0 g/10 min.

The mLLDPE has preferably a weight average molecular weight (Mw) of 100 000 to 250 000 kg/mol, more preferably 110 000 to 160 000 kg/mol.

The mLLDPE may be unimodal or multimodal, both are preferable. By unimodal is meant that the molecular weight profile of the polymer comprises a single peak and is produced by one reactor and one catalyst.

The unimodal mLLDPE polymers preferably possess a narrow molecular weight distribution. The Mw/Mn value is preferably 2 to 4, more preferably 2 to 3.

Multimodal can be understood as bimodal MWD or bimodal comonomer distribution (e.g. the MFR's of the components are the same, but they contain same comonomer in different amounts). Bimodal mLLDPE comprise a LMW component and a HMW component.

Both the LMW and HMW components of multimodal mLLDPE are preferably copolymers of ethylene as defined above.

The molecular weight distribution, Mw/Mn, of a multimodal mLLDPE may be below 30, preferably in the range of 2-5.

Suitable mLLDPE's are available commercially from ExxonMobil Chemical, Nova, Dow, Basell, to mention a few.

Alternatively, suitable mLLDPE polymers can be produced in a known manner according to or analogously to conventional polymerization processes, including solution, slurry and gas phase processes, described in the literature of polymer chemistry.

Unimodal mLLDPE, as defined above is preferably prepared using a single stage polymerization, e.g. solution, slurry or gas phase polymerization, preferably a slurry polymerization in slurry tank or, more preferably, in loop reactor in a manner well known in the art. As an example, said unimodal mLLDPE can be produced e.g. in a single stage loop polymerization process according to the principles given below for the polymerization of low molecular weight fraction in a loop reactor of a multistage process, naturally with the exception that the process conditions (e.g. hydrogen and comonomer feed) are adjusted to provide the properties of the final unimodal polymer.

Multimodal (e.g. bimodal) mLLDPE as defined above can be made by blending mechanically two or more separately prepared polymer components, or preferably, by in situ blending in a multistage polymerization process during the preparation process of the polymer components. Both mechanical and in situ blending is well known in the field.

Accordingly, preferred multimodal mLLDPE polymers are obtainable by in-situ blending in a multistage, i.e. two or more stage, polymerization process including solution, slurry and gas phase process, in any order. Alternatively said multimodal mLLDPE may be obtainable by using two or more different polymerization catalysts, including multi- or dual site catalysts, in a one-stage polymerization.

Preferably the multimodal mLLDPE as defined above is produced in at least two-stage polymerization using the same catalyst, e.g. a single site catalyst. Thus, for example two slurry reactors or two gas phase reactors, or any combinations thereof, in any order can be employed.

mLLDPE as defined above may be made using any conventional single site catalysts (SSC), which SSC catalysts include metallocenes.

All these catalysts are well known in the field. In case of mLLDPE, metallocene catalysis is preferably used herein. The preparation of the metallocene catalyst can be carried out according or analogously to the methods known from the literature and is within skills of a person skilled in the field. Thus for the preparation see e.g. EP-A-129 368, WO-A-9856831, WO-A-0034341, EP-A-260 130, WO-A-9728170, WO-A-9846616, WO-A-9849208, WO-A-9912981, WO-A-9919335, WO-A-9856831, WO-A-00/34341, EP-A-423 101 and EP-A-537 130. WO2005/002744 describes a preferable catalyst and process for preparing said mLLDPE component.

Instead of a znLLDPE or mLLDPE a plastomer as defined above for the first film can be used.

LDPE means herein a low-density ethylene homopolymer produced in high-pressure polymerization process (autoclave or tubular, as defined for the first film).

Such LDPEs are well known in the art and they typically contain long chain branching which differentiates LDPEs from linear low-density polyethylenes, LLDPEs.

LDPE usable in the sealant layer of present invention is in principal not limited.

LDPE may typically have a $MFR_2$ (190° C., 2.16 kg; ISO 1133) of at least 0.05 g/10 min, preferably in the range 0.1-20 g/10 min, more preferably 0.3-10 g/10 min, still more preferably 0.4-5 g/10 min. In one embodiment, LDPE with $MFR_2$ of 0.2 to 1.0 g/10 min is preferred.

The density (ISO 1183) of the LDPE is typically 905-940 kg/m$^3$, preferably 910 to 935 kg/m$^3$, e.g. 915 to 930 kg/m$^3$.

The Tm (DSC, ISO 11357-3) of the LDPE is preferably 70-180° C., more preferably 90-140° C., e.g. about 110-120° C.

LDPEs suitable for the second film structure are any conventional LDPEs, e.g. commercially known LDPEs, or they may be prepared according to any conventional high-pressure polymerization (HP) process in a tubular or autoclave reactor using a free radical formation. Such HP processes are very well known in the field of polymer chemistry and described in the literature, see e.g. Vieweg, Schely and Schwarz: Kunstoff Handbuch, Band IV, Polyolefins, Carl Hanser Verlag (1969), pages 39-51. Typical pressures are from 1000 to 3000 bar. The polymerization temperature is preferably 150-350° C. The free radical initiators are commonly known, e.g. organic peroxide based initiators.

Suitable LDPE's are available commercially from Borealis, Basell, Exxon, Sabic, or other suppliers.

The amount of LDPE present in the sealant layer is 5 wt % up to 50% wt, preferably 10 to 45 wt %, more preferably 20 to 40 wt %.

Thus the amount of mLLDPE or plastomer usable in the sealing layer typically varies between 50 to 95 wt %, preferably 55 to 90 wt % and more preferably between 60 to 80 wt % of the total amount of the sealant layer.

The second film may be a monolayer film (only layer C).

The second film may also be multi-layered. Multilayer films are preferably formed from at least two layers, ideally at least three layers, such as 3 layers, 5 layers or 7 layers.

For example one further layer (C-2) of the second film may be an LLDPE as described for layer A, preferably a multimodal, like bimodal LLDPE, more preferably a bimodal ethylene/1-butene/$C_6$-$C_{12}$-alpha-olefin terpolymer, with a density between 926 kg/m$^3$ to 950 kg/m$^3$.

In one embodiment the second film comprises a second further film layer (C-3) forming a 3-layer film structure of C-3/C-2/C.

The second further film layer C-3 is preferably made of the same LDPE as described for the sealant layer C.

The layers C, C-2 and C-3 may all be of equal thickness or alternatively the layer C-2, forming the in this case the core layer, may be thicker than each of C-3 and C, forming outer layers.

A convenient 3-layer film comprises two outer layers (C-3 and C), which each form 10 to 35%, preferably 15 to 30% of the total thickness of the 3-layered film, the core layer (i.e. C-2) forming the remaining thickness, e.g. 30 to 80%, preferably 40 to 70% of the total thickness of the 3-layered film.

The total thickness of the film is 100%, thus the some of the individual layers has to be 100%.

In a further embodiment the second film can comprise the sealant layer C, as described above, the at least one further layer C-2, as described above and additionally 3 further layers C-4, C-5 and C-6, forming a film of the structure C-6/C-5/C-4/C/C-2.

In this case C-2, C-4 and C-5 are composed of a LLDPE, which may be the same LLDPE in all three layers. These three layers may alternatively be composed of different LLDPEs or the middle layer of these three layers, in this case C-4, may be composed of one LLDPE and the two sandwiching layers, C-2 and C-5, may be composed of another LLDPE.

Suitable LLDPEs are described above for layer A of the first film.

Layer C-6 is composed of a blend of LLDPE and a metallocene produced linear low density polyethylene (mLLDPE).

Suitable LLDPEs are described above for layer A of the first film.

Suitable mLLDPEs are described above for the sealant layer C of the second film.

The amount of LLDPE in this layer is in the range of 40 to 80 wt %, preferably 50 to 70 wt % and more preferably 55 to 65 wt %, thus the mLLDPE being present in an amount of 20 to 60 wt %, preferably 30 to 50 wt % and more preferably 35 to 34 wt %.

The layers may all be of equal or different thickness.

For example the sealant layer C and the layer C-6 may each contribute 5 to 15%, preferably 8 to 12 wt % of the total thickness and the layers C-5, C-4 and C-2 contribute the rest, whereby these three layers may be of equal thickness. The layers C-5, C-4 and C-2 can also have different thicknesses, like 10 to 25%/30 to 60%/10 to 25%, preferably 15 to 20%/40 to 50%/15 to 20%.

The total thickness of the film is 100%, thus the sum of the thickness of the individual layers has to be 100%.

The second film can optionally contain a HDPE layer D in-between the above described multilayer structures or adhering to the sealant film C, being a monolayer film.

The HDPE layer may act as barrier layer and/or as stiffening layer.

If used in the multilayer structure the HDPE barrier layer D can be in any position between two adjacent layers, like C-3/D/C-2/C or C-3/C-2/D/C or C-6/D/C-5/C-4/C/C-2, C-6/C-5/D/C-4/C/C-2, and so on.

Suitable HDPE barrier layers D consisting of HDPE polymer, may comprise one single HDPE polymer component or a mixture of said HDPE polymer component with one or more other HDPE polymer components. Mainly due to economic reasons embodiments wherein layer D consists of one HDPE polymer or a mixture of two different HDPE polymers is preferred. When layer D consists of a mixture of two HDPE polymers, same may be present in any desired weight ratio, typically these two HDPE polymers are then present in a weight ratio of from 30:70 to 70:30, more preferably from 60:40 to 40:60.

HDPE polymers to be employed in accordance with the present invention are polyethylenes having a density of at least 940 kg/m$^3$, preferably at least 945 kg/m$^3$, more preferably in the range of from 950 to 980 kg/m$^3$, such as from 950 to 965 kg/m$^3$. In particular, it is preferred when the density of the HDPE polymer to be employed in accordance with the present invention is at least 955 kg/m$^3$.

An HDPE polymer to be employed in accordance with the present invention designates a polyethylene which may be either a homopolymer or a copolymer comprising a minor amount of repeating units derived from one or more alpha-olefins having from 3 to 20 carbon atoms, preferably from 3 to 10 and more preferably from 3 to 6 carbon atoms. The comonomer content of a copolymer may typically be from 0.25 mol % to 10.0 mol %, more preferably 0.5 mol % to 5.0 mol %, and more preferably the upper limit for the comonomer content is 2.5 mol %. In accordance with the present invention both homopolymers and copolymers of polyethylene are equally preferred.

The HDPE polymer to be employed in accordance with the present invention may be unimodal with respect to properties such as molecular weight distribution and/or comonomer content or the HDPE polymer to be employed in accordance with the present invention may be multimodal, in particular bimodal, with respect to properties such as molecular weight distribution and/or comonomer content.

A preferred embodiment in accordance with the present invention is a multimodal HDPE polymer, comprising at least a lower molecular weight component (LMW) and a higher molecular weight component (HMW). These components may be present in any desired ratios, with typical split, i.e. weight ratios between the LMW component and the HMW component being from 10:90 to 90:10, preferably 40:60 to 60:40. The LMW and/or HMW component can be a homo- or copolymer, preferably at least one of the LMW and HMW components is a homopolymer. More preferably, the LMW component is a homopolymer and the HMW component is homo- or copolymer, typically a copolymer.

In accordance with preferred embodiments of the present invention, layer D either consists of a unimodal HDPE polymer (with respect to the molecular weight distribution) or of a multimodal, preferably bimodal HDPE polymer (with respect to the molecular weight distribution).

The melt flow rate (MFR) of the HDPE polymer to be employed for layer D in accordance with the present invention is not critical and can be varied depending on the mechanical properties desired for an end application. In one preferable embodiment MFR$_2$ value in the range of from 0.05 to 10 g/10 min, preferably 0.1 to 2 g/10 min and more preferably from 0.3 to 0.8 g/10 min are desired. In another preferable embodiment MFR$_{21}$ value in the range of from 2 to 12 g/10 min, preferably 4 to 10 g/10 min, more preferably 6 to 8 g/10 min are desired.

The HDPE polymer to be employed in accordance with the present invention may be a known and e.g. commercially available, polyethylene polymer or said HDPE polymer may be prepared using any coordination catalyst, typically ZN catalysts, Cr-catalyst as well as single site catalysts (SSC). The molecular weight distribution (MWD) expressed as Mw/Mn of the HDPE polymer to be employed in accordance with the present invention is not critical and can vary depending, again, on the mechanical properties desired for the end application. MWD is preferably in the range of from 2 to 35, wherein preferred ranges for, unimodal HDPE polymer are from 2 to 20, preferably 3 to 10, in particular 4 to 7 and more preferably 4.5 to 6.0, while preferred ranges for multimodal, preferably bimodal HDPE polymer are from 10 to 35, preferably 12 to 20, whereas in some embodiments, as broad as 15 to 35 may be desired.

HDPE polymer to be employed in accordance with the present invention may be produced using polymerization reactions which are, in principle, known in the art and available to the skilled person.

Typical SSC catalysts are metallocenes and non-metallocenes, such as disclosed in EP 129368 A, WO 98/56831, WO 00/34341, EP 260130 A, WO 97/28170, WO 98/46616, WO 98/49208, WO 99/12981, WO 99/19335, WO 98/56831, WO 00/34341, EP 423101 A and EP 537130. Typical ZN catalysts are, for example, disclosed in WO 95/35323, WO 01/55230, EP 810235 A and WO 99/51646. The above references for the catalyst are examples of typical useful catalysts, naturally other type of SSC or ZN catalysts, may be employed as well.

The HDPE polymers to be employed in accordance with the present invention may be produced in principle using any polymerization method, including solution, slurry and gas phase polymerization. The temperature in the polymerization reactor needs to be sufficiently high to reach an acceptable activity of the catalysts, while not exceeding the softening temperature of the polymer, in order to avoid processing problems. Typical polymerization temperatures may therefore be in the range of from 50 to 110 deg. C., preferably 75 to 105 deg. C. and more preferably 75 to 100 deg. C. Reactor pressures can be selected over a broad range depending on the type of polymerization and, in principle, are known to the skilled person. Suitable pressure ranges for slurry polymerizations are, for example, 10 to 100 bar, preferably 30 to 80 bar.

A multimodal HDPE polymer to be employed in accordance with the present invention may, in particular, be a so called in-situ blend produced during the polymerization process of said multimodal HDPE. Such in-situ multimodal HDPPE can be prepared using two or more polymerization stages or by using two or more different catalysts and/or different polymerization conditions in a one-stage polymerization. Preferably, multimodal HDPE polymers, in particular the above discussed bimodal embodiments, are prepared in a two-step polymerization comprising a slurry polymerization, for example in a loop reactor, followed by a gas phase polymerization in a gas reactor. A preferred loop reactor-gas phase reactor system in this respect is generally known as Borstar reactor system.

The polymerization conditions in the slurry polymerization will be typically as outlined above, with residence times in the range of from 0.3 to 5 hours, such as 0.5 to 2 hours. A suitable diluent may be employed, such an aliphatic hydrocarbon having a boiling point in the range from −70 to 100 deg. C., such as propane or isobutane. In the gas phase polymerization, the temperature will preferably in the range of from 50 to 130 deg. C., more preferably from 60 to 115 deg. C., with pressures being in the range of from 10 to 60 bar, 10 to 40 bar, with residence time of from 1 to 8 hours. Hydrogen may be added to any of the polymerization stages in order to control the molar mass in a manner known to the skilled person.

The properties of the polymer composition can be adjusted or controlled in a known manner e.g. with one or more of the following process parameters: hydrogen feed, comonomer feed, monomer feed, catalyst feed and, in case of a multimodal HDPE polymer, split, i.e. weight ratio, between the polyethylene components present in said multimodal HDPE. As well known, the adjustment of said MFR value to a desired level may be effected during the polymerisation process by adjusting and controlling the process conditions, e.g. by regulating the molecular weight of the polymerisation product using a molecular weight regulator, e.g. hydrogen.

The film structure for the second film in accordance with the present invention may be prepared by any conventional film extrusion procedure known in the art, e.g. with cast film or blown film extrusion. Preferably, the film is formed by blown film extrusion, more preferably by co-extrusion processes, which in principle are known and available to the skilled person. Typical processes for preparing a film structure in accordance with the present invention are extrusion processes through an angular die, followed by blowing into a tubular film by forming a bubble which is collapsed between the rollers after solidification. This film can then be slid, cut or converted, such as by using a gazette head, as desired. Conventional film production techniques may be used in this regard. Typically the layers are coextruded at a temperature in the range of from 160 to 240° C. and cooled by blowing gas (generally air) at a temperature of 5 to 50° C., to provide a frost line height of 1 or 2 to 8 times the diameter of the dye. The blow up ratio can be in the range of from 1 (1:1) to 4 (1:4), preferably 1.5 (1:1.5) to 3.5 (1:3.5), more preferably from 2 (1:2) to 3 (1:3).

If the second film is oriented in machine direction, the same procedure as described for the first film is applied.

Ad Laminated Structure

The laminated film structure comprising the first film and the second film is obtained by laminating the first film to the second film.

The first film is laminated to the second film with the coated surface side.

If the second film comprises layer C and D, then the first film is laminated with its coated surface to layer D.

If the second film comprises layer C-3, C-2 and layer C having the structure C-3/C-2/C, then the first film is laminated with its coated surface to layer C-3.

If the second film comprises layer C-6, C-5, C-4 and layer C having the structure C-6/C-5/C-4/C/C-2, then the first film is laminated with its coated surface to layer C-6.

The lamination step of the first film to the second film may be effected in any conventional lamination device using conventional lamination methods, such as adhesive lamination including both solvent based and "solvent less" adhesive lamination using any conventional, e.g. commercially available, adhesive, or sandwich lamination with or without a melt web which can be pressed between the substrates. Such melt web can be any conventional melt web material based on polyethylene, such as LDPE. Solvent based and solvent less lamination methods are well known and well described in various literatures.

The lamination step can also be done via extrusion coating technique.

The laminated structure according to the present invention can be employed in a wide variety of end applications however they are of particular interest in the manufacture of packaging, especially food, drink or medical packaging or packaging of goods in medium duty or heavy duty shipping sacks.

In particular the films may be utilised in form, fill and seal packaging technology or in the formation of pouches, especially stand up pouches, sacks, bag, sachets, and the like.

The final thickness of the laminated structure depends on the desired end use and is therefore chosen accordingly. This procedure is within the skill of an art skilled person.

In the laminated structure according to the invention the barrier layer coating of the first film is present in less than 3% of the total film thickness, preferably of less than 1% of the total thickness of the laminated structure and more preferably of less than 0.5% of the total thickness of the laminated structure, thus the laminate can still be called full PE or 100% PE laminate.

The laminated film structure of the present invention has many advantageous. As it is a more or less "100% PE" solution with no other polymer than ethylene based polymers being present, the laminated film structure is fully recyclable and thus improves sustainability. Furthermore, due to the fact that the oriented first film used according to the invention can be further down gauged than known solutions, less material is needed to prepare the laminated film structure and thus saves costs and material, without destroying other properties.

The laminates of the present invention have good barrier properties, like good gas and water vapour barrier properties.

In industry oxygen transmission rates (measured according to ISO ASTM F-1927, 23° C., 50% humidity) of below 100 $cm^3/m^2/1$ day, preferably below 50 $cm^3/m^2/1$ day and water vapour transmission rates (according to according to ASTM F-1249; 37.8° C., 90% humidity) of below 5 $g/m^2/1$ day are desired.

The laminates according to the present invention comprising the coated oriented first film of the present invention fulfill these requirements and show even improved values compared to reference materials being composed of PET/PE benchmark Thus the laminates of the present invention show an oxygen transmission rate (OTR; ASTM F-1927; 23° C., 50% RH) of lower than 50 $cm^3/m^2/1$ day, preferably lower than 30 $cm^3/m^2/1$ day and more preferably lower than 20 $cm^3/m^2/1$ day.

The water vapour transmission rate (WVTR, ASTM F-1249; 37.8° C., 90% humidity) of the laminates of the present invention is below 5 $g/m^2/1$ day, preferably below 4 $g/m^2/1$ day and more preferably below 3 $g/m^2/1$ day.

Application

The laminated polyethylene based film structure having barrier properties according to the invention is suitable for the use in vertical or horizontal Form Fill Seal (FFS) packaging, pouches, especially stand up pouches, sacks, bags, sachets, and the like.

EXPERIMENTAL PART

Measuring Methods

The following definitions of terms and determination methods apply for the above general description of the invention as well as to the below examples unless otherwise defined.

Melt Flow Rate (MFR) The melt flow rates are measured at 190° C. with a load of 2.16 kg ($MFR_2$), respectively with a load of 5.0 kg ($MFR_5$) according to ISO 1133

Density

The density was measured according to ISO 1183 and ISO1872-2 for sample preparation.

Gloss and haze as measures for the optical appearance of the films were determined according to ASTM D2457 (gloss; (measured outside, lengthwise, measuring angle 20°)) and ASTM D1003 (haze), on first film samples with a thickness of 25 μm.

Tensile Modulus

Film TD (Transversal Direction) and MD (Machine Direction)

Tensile moduli in machine and transverse direction were determined acc. to ISO 527-3 at room temperature on films with a thickness of 25 μm at a cross head speed of 1 mm/min for the MDO blown film of the inventive example.

Furthermore the tensile modulus in machine direction was determined acc. to ISO 527-1 and ISO 527-3 at 70° C. on films with a thickness of 25 μm at a cross head speed of 1 mm/min for the MDO blown film of the inventive example.

Oxygen Transmission Rate (ORT)

Oxygen transmission rate values were measured by ASTM F-1927 using a pressure sensor method (standard conditions 23° C., 50% humidity). OTR is measured in a chamber where first both sides of the film are evacuated and then $O_2$ is slowly let to the other side and the gas sensor measures the content from the vacuum side.

Water Vapour Transmission Rate WVTR

Water vapour transmission rates are determined under tropical conditions (37.8° C., 90% rel. humidity) according to ASTM F-1249.

EXAMPLES

The following film structures have been prepared:

Inventive Examples

Coated first film:
IE 1: PE-AlOx
IE 2: PE-Al
IE 3: PE-SiOx
Laminated structure:
IE 4: PE-SiOx/PE Comparative Example CE 1: 12 μm PET/70 μm PE benchmark Commercially available standard 12 μm PET/70 μm PE laminate was used.

Film Preparation

First film of IE1, IE2, IE3 was coextruded on a 5-layer Alpine co-extrusion line with die diameter 400 mm, at a blow up ratio (BUR) of 1:2.7, frost line height 3D and Die gap 1.5 mm.

The formed films had a thickness of 110 μm (blocked film).

The composition of the 5 layers can be seen in Table 1:

|  |  | Layer | | | | |
| --- | --- | --- | --- | --- | --- | --- |
|  |  | A | B | C | D | E |
| Borshape FX1001 | wt % |  | 98.5 | 98.5 | 98.5 | 80.0 |
| Hostalen 7740 F2 | wt % | 96.5 | — | — | — | — |
| Queo 8201 | wt % | — | — | — | — | 20 |
| Polybatch ® AMF 705 HF | wt % | 0.5 | — | — | — | — |
| POLYBATCH ® CE-505-E | wt % | 1.5 | 1.5 | 1.5 | 1.5 | — |
| Polybatch ® AB 35 VT | wt % | 1.5 | — | — | — | — |

Borshape FX1001: bimodal Ziegler Natta produced terpolymer (C2/C4/C6) Grade BorShape™ (provided by Borealis AG). FX1001 has $MFR_5$ of 0.85 g/10 min, density of 931 kg/m³.

Hostalen 7740 F2: high density polyethylene provided by LyondellBasell, $MFR_5$ of 1.8 g/10 min, density of 948 kg/m³.

Queo™ 8201: ethylene based octene plastomer, MFR (190/2.16) of 1.1 g/10 min, unimodal, density 882 kg/m', produced in a solution polymerization process using a metallocene catalyst provided by Borealis AG). It contains processing stabilizers.

Polybatch® AMF 705 HF: processing agent provided by A. Schulman.

Polybatch® CE-505-E: is a 5% erucamide slip concentrate based in polyethylene provided by A. Schulman.

Polybatch® AB 35 VT: anti-blocking and slip agent masterbatch provided by A. Schulman Stretching was carried out using a monodirectional stretching machine manufactured by Hosokawa Alpine AG in Augsburg/Germany. The unit consists of preheating, drawing, annealing, and cooling sections, with each set at specific temperatures to optimize the performance of the unit and produce films with the desired properties. The heating was at 105° C., the stretching was done at 115° C., annealing and cooling was done at 110° down to 40° C.

The film obtained from blown film extrusion was pulled into the orientation machine then stretched between two sets of nip rollers where the second pair runs at higher speed than the first pair resulting in the desired draw ratio. Stretching is carried out with the respective draw ratios to reach the desired thickness. (draw ratios and final thickness of MDO films are given in Table 2) After exiting the stretching machine the film is fed into a conventional film winder where the film is slit to its desired width and wound to form reels.

The properties of the MDO film are also given in Table 2:

TABLE 2

| first film - oriented in machine direction | | | |
| --- | --- | --- | --- |
| First film | | | |
| Primary film thickness [μm] | | | 110 |
| Draw ratio | | | 4.5 |
| Final film thickness [μm] | | | 25 |
| Parameter | | Unit | |
| Tensile test MD/TD | Tensile modulus | MPa | 860/1110 |
| Tensile test 70° C. MD | Tensile modulus | MPa | 232 |
| ratio | | | 3.7 |
| Optics | Gloss (20°) | % | 136 |
|  | Haze | % | 4 |

Coating with Barrier Layer

The first film was coated with barrier layers (AlOx, Al, SiOx) at AMAT (Applied Materials, Inc.) to yield the films of IE1, IE2 and IE3

The OTR and WVTR were measured on these coated first films using Mocon equipment. Te results are summarized in Table 3.

TABLE 3

OTR and WVTR of coated first film

| | IE1<br>PE-10 nmAlOx | IE2<br>PE-40 nmAl | IE3<br>PE-10 nmSiOx |
|---|---|---|---|
| WVTR; 37.8° C., 90% RH (g/m2-day) | 5.6 | 1.7 | 3.1 |
| O2; 23° C., 50% RH (cc/m2-day) | 966 | 395 | 543 |

Preparation of Laminate

The lamination step was done on a commercially available Nordmeccanica lamination machine. As adhesive between the layers a commercially available two component solvent-based polyurethane adhesive from H.B. Fuller was used.

As second film a commercially available standard 70 μm PE film was used (the same as is part of the laminate of CE1).

IE 4: 25 μm PE-10 nmSiOx/70 μm PE

Comparative Example CE1

12 μm PET-layer/70 μm PE benchmark

The OTR and WVTR were measured on these laminates using Mocon equipment. The results are summarized in Table 4.

TABLE 4

OTR and WVTR of laminate

| | CE1<br>PET/PE<br>benchmark | IE4<br>PE-<br>SiOx/PE |
|---|---|---|
| WVTR; 37.8° C., 90% RH (g/m2-day) | 4.5 | 2.1 |
| O2; 23° C., 50% RH (cc/m2-day) | 106 | 18.3 |

The invention claimed is:

1. A laminated polyethylene based film structure having barrier properties, the laminated polyethylene based film structure comprising
   (1) one oriented first film comprising:
      a) at least one layer A based on a polyethylene polymer having a density of from 890 to 980 kg/m$^3$, and
      b) at least one layer B, wherein layer B comprises: a high density polyethylene (HDPE) having a density of from 940 to 970 kg/m$^3$, a medium density polyethylene (MDPE) having a density of from 925 to 940 kg/m$^3$, or a linear low density polyethylene (LLDPE) having a density of 910 up to 950 kg/m$^3$,
      wherein the oriented first film:
         is at least oriented in machine direction (MDO film) in a draw ratio of from 1:1.5 to 1:12 and has a film thickness after orientation of from 10 to 50 μm, and
         has one surface that is coated by a thin vapor deposited barrier ceramic or metal layer, such that the oriented first film has a coated surface having a thickness of from 5 nanometers (nm) to 200 nm; and
   (2) a second film laminated onto the coated surface of the oriented first film, wherein the second film comprises
      c) at least one sealant layer C based on a polyethylene polymer, and
      d) optionally a high density polyethylene (HDPE) barrier layer D, and
   wherein polymers other than ethylene based polymers are substantially absent from the laminated polyethylene based film structure.

2. The laminated polyethylene based film structure according to claim 1, wherein the polyethylene polymer of layer A is selected from the group consisting of a high density polyethylene (HDPE), a medium density polyethylene (MDPE), a linear low density polyethylene (LLDPE), a blend of a linear low density polyethylene (LLDPE) with a high pressure low density polyethylene (LDPE), and a blend of an ethylene based plastomer with a high pressure low density polyethylene (LDPE).

3. The laminated polyethylene based film structure according to claim 1, wherein the polyethylene polymer of layer A is a linear low density polyethylene (LLDPE) with an MFR$_2$ (190° C., 2.16 kg, ISO 1133) in the range of from 0.01 to 20 g/10 min and a density in the range of from 910 to 950 kg/m$^3$.

4. The laminated polyethylene based film structure according to claim 3, wherein the linear low density polyethylene (LLDPE) contains at least one or two $C_3$-$C_{10}$ alpha-olefin comonomer(s), wherein the LLDPE is produced using a Ziegler-Natta catalyst.

5. The laminated polyethylene based film structure according to claim 1, the at least one layer B comprises a layer of a high density polyethylene (HDPE) having a density of from 940 to 970 kg/m$^3$.

6. The laminated polyethylene based film structure according to claim 1, wherein the oriented first film further comprises an additional layer E, wherein the layer E comprises a high density polyethylene (HDPE) having a density of from 940 to 970 kg/m$^3$, a medium density polyethylene (MDPE) having a density of from 925 to 940 kg/m$^3$, or a linear low density polyethylene (LLDPE) having a density of from 910 to 950 kg/m$^3$.

7. The laminated polyethylene based film structure according to claim 6, wherein the oriented first film:
   is an unblocked film having the structure E/A/B, or
   is a blocked film having the structure E/A/BL/BL/A/B or E/A/A/A/BL/BL/A/A/A/B,
      wherein BL is a blocking layer comprising a blend of a LLDPE as used in layer A and an ethylene based plastomer with a density below 915 kg/m$^3$.

8. The laminated polyethylene based film structure according to claim 6, wherein the layer E is the same as the layer B.

9. The laminated polyethylene based film structure according to claim 6, wherein the layer E is different than the layer B.

10. The laminated polyethylene based film structure according to claim 1, wherein the oriented first film is only oriented in machine direction.

11. The laminated polyethylene based film structure according to claim 10, wherein the machine direction oriented first film has i) a tensile modulus (according to ISO 527-3) in machine direction measured on a 25 μm MDO film at room temperature of at least 800 MPa,
ii) a tensile modulus (according to ISO 527-1 and 527-3) in machine direction measured on a 25 μm MDO film at 70° C. of at least 100 MPa,
iii) a ratio of i) to ii) of below 10,
iv) a gloss(20°) according to ASTM D2457 for a film thickness of 25 μm of at least 30%, and
v) a haze according to ASTM D1003 for a film thickness of 25 μm of below 30%.

12. The laminated polyethylene based film structure according to claim 1, wherein the coated surface of the oriented first film is coated with an aluminum coating, an AlOx coating, or a SiOx coating.

13. The laminated polyethylene based film structure according to claim 1, wherein the laminated polyethylene based film structure shows an oxygen transmission rate (OTR; ASTM F-1927; 23° C., 50% RH) of lower than 50 $cm^3/m^{2/1}$ day and a water vapor transmission rate (WVTR, ASTM F-1249; 37.8° C., 90% humidity) of below 5 $g/m^2/1$ day.

14. A laminated article comprising the laminated polyethylene based film structure of claim 1.

15. A method of use of the laminated polyethylene based film structure of claim 1, the method comprising using the laminated polyethylene based film for producing vertical or horizontal form fill seal packaging, pouches, sacks, or bags.

* * * * *